(12) United States Patent
Steijer

(10) Patent No.: US 6,408,174 B1
(45) Date of Patent: *Jun. 18, 2002

(54) COMMUNICATION METHOD, SYSTEM, AND DEVICE FOR REDUCING PROCESSOR LOAD AT TARIFF SWITCH

(75) Inventor: Jörgen Steijer, Linköping (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,529

(22) Filed: May 13, 1997

(51) Int. Cl.$^7$ ............................................. H04M 11/00
(52) U.S. Cl. ....................................... 455/407; 455/406
(58) Field of Search ................................. 455/405, 406, 455/407, 408, 414, 566; 379/111, 130, 131, 114.09, 114.1, 114.12, 114.01, 114.02, 121.02, 121.04, 122

(56) References Cited

U.S. PATENT DOCUMENTS

| | | | |
|---|---|---|---|
| 4,726,056 A | 2/1988 | An et al. | |
| 4,751,728 A | 6/1988 | Treat | |
| 5,109,401 A | * 4/1992 | Hattori et al. | 455/407 |
| 5,303,297 A | * 4/1994 | Hillis | 455/406 |
| 5,400,395 A | 3/1995 | Berenato | |
| 5,488,655 A | 1/1996 | Hamlen | |
| 5,577,100 A | * 11/1996 | McGregor et al. | 455/406 |
| 5,602,907 A | * 2/1997 | Hata et al. | 379/131 |
| 5,974,308 A | * 10/1999 | Vedel | 455/407 |
| 6,138,002 A | * 10/2000 | Alperovich et al. | 455/407 |
| 6,148,191 A | * 11/2000 | Kim | 455/407 |
| 6,188,754 B1 | * 2/2001 | Kikuchi et al. | 379/114 |
| 6,195,543 B1 | * 2/2001 | Granberg | 455/407 |

FOREIGN PATENT DOCUMENTS

| | | | | |
|---|---|---|---|---|
| DE | 19808183 | * | 9/1999 | |
| DE | 19918848 | * | 11/2000 | |
| EP | 0115924 | * | 8/1984 | |
| EP | 0597638 | * | 5/1994 | |
| EP | 0647055 | * | 4/1995 | |
| EP | 0 647 055 | | 4/1995 | H04M/15/28 |
| EP | 0 734 144 | | 9/1996 | H04M/15/28 |
| EP | 0813332 | * | 12/1997 | |
| EP | 1043907 | * | 10/2000 | |
| GB | 2272607 | * | 5/1994 | |
| JP | 11088492 | * | 3/1999 | |
| JP | 09335559 | * | 6/1999 | |
| WO | 92/11725 | * | 7/1992 | |
| WO | WO95/20298 | | 7/1995 | H04Q/7/22 |
| WO | WO 96 18259 | * | 6/1996 | H04M/1/00 |
| WO | WO96/24229 | | 8/1996 | H04Q/7/32 |

OTHER PUBLICATIONS

Patent Abstracts of Japan, vol. 14, No. 451, (E–0984), Sep. 27, 1990 & JP 02 180462 A (Taiko Denki Seisakusho:KK;Other: 01), Jul. 13, 1990.

* cited by examiner

*Primary Examiner*—Vivian Chang
*Assistant Examiner*—Charles N. Appiah
(74) *Attorney, Agent, or Firm*—Burns, Doane, Swecker & Mathis, L.L.P.

(57) ABSTRACT

A communication device, method and system in which tariff information is provided to a communication device from a control station at call setup, and the charges associated with a call can be calculated and displayed to a device user at the device itself, rather than at a central communication system processor. The tariff information includes the current tariff, future tariff, and time of tariff switch. By providing the tariff information to the communication device, significant signal processing resources at the central communication system processor can be saved.

6 Claims, 3 Drawing Sheets

FIG. 1

| | PLAN 1 | | | | PLAN 2 | | |
|---|---|---|---|---|---|---|---|
| MONTHLY CHARGE | 7300 YEN | | | | 4400 YEN | | |
| | DAY 08-19 | NIGHT 19-24 | MORNING 24-08 | | DAY 08-19 | NIGHT 19-24 | MORNING 24-08 |
| TC = a LOCAL CHARGING AREA | T = 1 TP = 9.0 SEC. | T = 2 TP = 16.0 SEC. | T = 3 TP = 18.0 SEC. | TC = b | T = 4 TP = 5.5 SEC. | T = 5 TP = 10.0 SEC. | T = 6 TP = 11.0 SEC. |
| TC = c OTHER AREA < 160Km DISTANCE | T = 7 TP = 8.0 SEC. | T = 8 TP = 14.5 SEC. | T = 9 TP = 16.0 SEC. | TC = d | T = 10 TP = 5.0 SEC. | T = 11 TP = 9.0 SEC. | T = 12 TP = 10.0 SEC. |
| TC = e OTHER AREA > 160Km DISTANCE | T = 13 TP = 6.5 SEC. | T = 14 TP = 12.0 SEC. | T = 15 TP = 13.0 SEC. | TC = f | T = 16 TP = 4.0 SEC. | T = 17 TP = 7.0 SEC. | T = 18 TP = 8.0 SEC. |

US 6,408,174 B1

COMMUNICATION METHOD, SYSTEM, AND DEVICE FOR REDUCING PROCESSOR LOAD AT TARIFF SWITCH

FIELD OF THE INVENTION

The present invention generally relates to billing or tariff calculation for communication systems. More particularly, the present invention relates to a method, device, and system for determining tariffs while conserving the processing resources of a central communication system processor.

BACKGROUND OF THE INVENTION

It is frequently desirable for a person placing a call over a telecommunication system to be informed of the costs of the call. Thus, many telecommunication systems incorporate charging services which inform a calling party of the tariff. The tariff is typically based on some number of component charging elements, such as: 1) a charge indicator for indicating to a calling party whether that party will be charged for the call; 2) initial start units indicative of service charges to be assessed at the start of the charging period; 3) an initial time period indicative of the time from the start of the charging period until the first periodic increment of service charges; 4) a time period indicative of the time between subsequent increments of service charges; and 5) units per time period (UTP), indicative of the number of charging units (e.g., dollars) to be added periodically to service charges at the expiration of the initial time period and subsequent time periods. From this information, or similar parameters, the total tariff or charge for a call can be calculated.

FIG. 1 is a table showing exemplary tariff charging elements for different calling plans. In this example, subscribers to each plan are assessed a monthly charge (in this example, 7300 yen or 4400 yen), and are also charged for calls according to the rates for various tariff classes (TC= a–f) as expressed in the table. The tariff classes are determined based upon the distance involved in a subscriber's call (e.g., whether the call is within a predetermined local area, some other area within 160 km, or an area greater than 160 km), and upon the particular monthly plan in which the subscriber is enrolled. For each tariff class, the tariff to be applied depends upon the time frame during which the call takes place (e.g., day, night, morning).

FIG. 2A is a graphical representation of how the charging elements affect the service charges. The graph shows the applicable service charges (including an initial unit IV and additional units per time period UTP) as a function of time, i.e., the service charges that would be applied if a call "release" were to occur at a particular time, in this case designated by X.

Tariff charging elements are subject to change due to factors such as a change in day (e.g., from a mid-week day to a weekend day or holiday), or a change in the time of day (e.g., from a daytime rate to an evening rate). Sometimes, a tariff switch will occur during a call. FIG. 2B is a graphical representation showing the effect of such a tariff switch at time X. A typical tariff change can be expressed as a change in charge rate per time period (e.g., from $0.10/minute to $0.20/minute), a change in time period duration (e.g., $0.10/ minute to $0.10/30 seconds), or both.

Most charging services are implemented by a central system processor, which, in the event of a change in the tariff information during a communication, must re-determine the tariff charging elements for each caller and notify each calling party of the change. Thus, when a tariff change occurs, significant signal processing resources are consumed. Further, because a tariff change may affect a large number of callers, there can be a significant drain on central system processor resources when a tariff change occurs, and there can also be significant delays in notifying calling parties about the tariff change. Known tariff calculation methods and systems do not adequately address this problem.

U.S. Pat. No. 5,303,297 to Hillis discloses a billing system which adapts to a communication system in real time. A central system processor, or billing computer, computes the rate, which is indicated to an individual user. If the user agrees to the rate, the call is connected and the central system processor recalculates the rate based on the overall system load. Each time the rate changes (due to system load changes), the user is notified and asked for approval.

U.S. Pat. No. 5,488,655 to Hamlen discloses a method and system for controlling traffic load by using variable price incentives. Hamlen is similar to Hillis in that a rate is calculated by a central processor, which provides the rate to the user.

U.S. Pat. No. 4,751,728 to Treat discloses a telephone call monitoring, metering and selection device which attaches to a standard telephone. A user pre-programs rate information for multiple telephone service providers (e.g., different long distance companies), which allows the device to determine which service provider will cost the least for a given call. While the device is capable of calculating rates and displaying cost to a user, the device is not an integral part of the telephone. Further, since the rate information is programmed by the user, the device is subject to human error.

U.S. Pat. No. 5,400,395 to Berenato discloses a telephone line selector and accounting system for selecting the lowest-priced long distance carrier and displaying rate information to a user during a phone call. The system automatically calculates rate information based on carrier update tones, and can be connected between several carriers and multiple telephones. The device therefore is not an integral part of the telephone.

All of the above-described systems involve the calculation of rates at a device external to a telephone device, and therefore do not adequately address the problem of reducing processor load upon the occurrence of a tariff switch. It would be desirable for a rate calculation system to reduce this processor load.

SUMMARY OF THE INVENTION

The present invention overcomes the above-noted problems, and achieves additional advantages, by providing for a tariff calculation system in which tariff information is provided to a communication system user (i.e., a mobile communication device) at call set-up. By providing the tariff information to a device at call set-up, the user's communication device can perform the tariff calculation, thus reducing the processor load of the central system processor.

BRIEF DESCRIPTION OF THE DRAWINGS

The present invention can be more fully understood upon reading the following Detailed Description of the Preferred Embodiments in conjunction with the accompanying drawings, in which:

FIG. 1 is a table of tariff charges for a typical telecommunication system;

DETAILED DESCRIPTION OF THE PREFERRED EMBODIMENTS

Figure 2A:
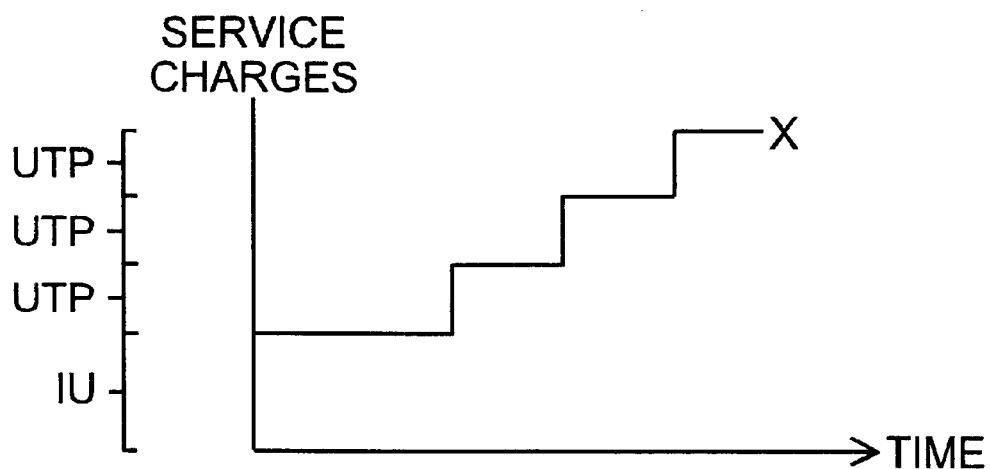
FIGS. 2A and 2B are graphical representations of tariff charges for a typical telecommunication system during a time period with a constant tariff rate and during a time period which includes a tariff switch, respectively.
Figure 2B:
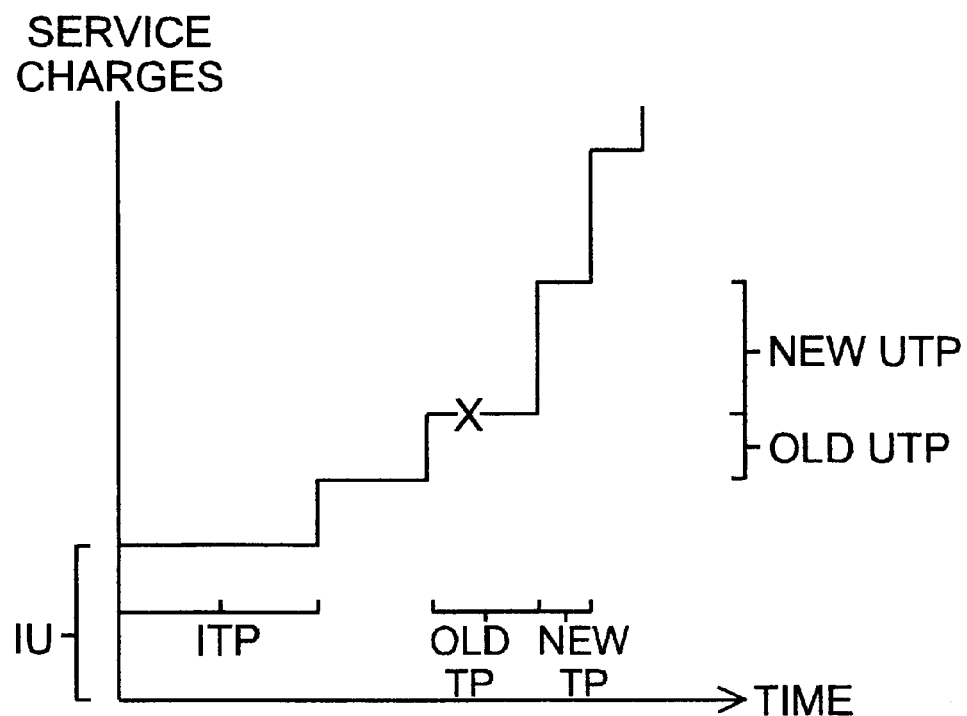
Figure 3:
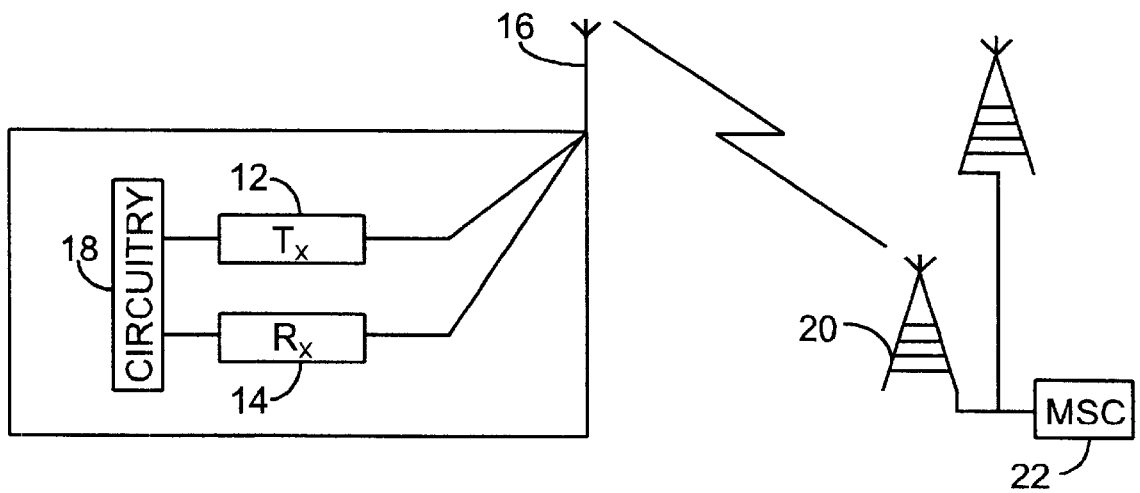
FIG. 3 is a block diagram of a communication device and system which advantageously employs a method according to the present invention.

FIG. 3 shows a block diagram of a wireless communication device and system in which the present invention can be implemented. It will be appreciated that while a wireless communication system is shown, the principles of the present invention are applicable to many types of communication devices and systems. In FIG. 3, the device 10 includes a transmitter circuit 12, receiver circuit 14, an antenna 16, and processing circuitry 18. The device 10 transmits and receives signals through antenna 16, to allow the device to exchange communication signals with a control station such as base station 20. The base station 20 communicates with a plurality of communication devices substantially similar to the device 10. In a typical wireless communication system, multiple base stations are provided, and each base station is connected to another control station such as central mobile switching center (MSC) 22 associated with a public switched telephone network (PSTN- not shown). In a typical communication system, tariff information is calculated at the MSC 22 and transmitted as necessary to individual communication devices such as device 10. When a tariff switch occurs, it becomes necessary to notify a potentially large number of communication devices engaged in communication. As discussed above, a tariff switch causes a significant drain on processor resources at the MSC 22.

In accordance with the present invention, when the communication system establishes a communication link between device 10 and base station 20, which may be the result of device 10 initiating a call or receiving a call, tariff information is sent to the device 10, and is stored in processing circuitry 18. This tariff information allows the device 10 to calculate and display to the user of the terminal the charge rate or total tariff. The tariff information preferably includes the current tariff, the future tariff, and the time until the tariff switch will occur. By performing tariff calculations in the communication device 10 rather than the MSC 22, significant processing resources at the MSC 22 can be saved.

Figure 4:
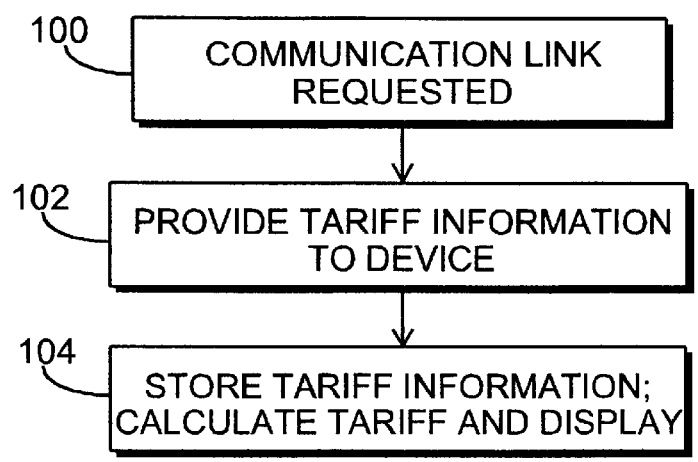
FIG. 4 is a flow chart describing the method according to an exemplary embodiment of the present invention.

FIG. 4 is a flow chart describing a method according to an exemplary embodiment of the present invention. The process begins in step 100, when a communication link involving a communication device 10 is requested. The request can be initiated by the communication device 10 or by another communication device seeking to communicate with communication device 10. In step 102, the MSC 22 provides tariff information, including charging rates for the currently applicable tariff, the next tariff, and the time at which the applicable tariff will switch from the current tariff to the next tariff, to the device 10. Since, in the exemplary tariff schedule shown in FIG. 1, the tariff class includes the current tariff, next tariff, and time of tariff switch, the tariff class can be transmitted to the device 10 as the tariff information. The tariff information is preferably provided at or before call setup (that is, at or before the establishment of the communication link). In step 104, the tariff information is stored in the device 10 (e.g., in processing circuitry 18), and the device 10 calculates and displays tariff information for the subscriber.

A particular example of a call in which the present invention can be implemented will now be described.

The tariff information provided to the device 10 in step 102 includes a current tariff associated with a current time period value (TP1), and a next tariff associated with a next time period value (TP2). The next tariff is the tariff to be used after the tariff switch. Also provided is the time from call setup to the tariff switch, as calculated at the control station (base station 20 or MSC 22).

According to an exemplary embodiment, the time until the tariff switch is converted to a number of current time periods until tariff switch (NTPUTS) at the control station, according to the following equation:

$$NTPUTS = \text{time until tariff switch current time period.}$$

Thus, the new charging elements (associated with the next tariff) are not applied until the expiration of the ongoing time period.

For example, assuming a time until tariff switch of 3 minutes and 15 seconds (i.e., 195 sec.), a current time period of 10 seconds, and the corresponding NTPUTS value is 195/10 (i.e., approximately 20).

The NTPUTS and the next time period are sent, together with the current time period, to the device 10 in a call setup message.

By implementing a counter in the device 10, the device can determine when a tariff switch will occur, and then automatically adjust the time period value.

In this example, a tariff class TC=a is applicable for a call within a predefined local area. If the call is made at 18.25.14 hours, tariff T=1 will be used. The current time period value according to tariff 1 is 9.0 seconds. Since the tariff class TC=a, the tariff 1 will change to tariff 2 at 19.00 hours.

The time left until the tariff switch is 19.00.00 −18.25.14= 34 min. and 46 seconds, or 2086 seconds.

In this example, $NTPUTS = 2086/9 = 231.78 =$ approximately 232.

The time period value for tariff 2 is 16.0 seconds.

Thus, in this example, the following data will be included in the tariff information provided to the device 10 at call setup:

Current time period=9.0 sec.

NTPUTS=232.

Next time period=16.0 sec.

As a result of being provided with this information, the device 10 can determine when 232 time periods have expired, and can change the time period value from 9.0 seconds to 16.0 seconds upon the expiration of the 232 time periods.

It will be appreciated that according to the present invention, by sending tariff switch information at call setup instead of waiting until a tariff switch, the central processor load at the tariff switch will be reduced. Furthermore, the present invention avoids the time differential resulting from sending tariff switch information to individual devices, since the information is already in the mobile station.

While the foregoing has included many details and specificities, it is to be understood that these are merely for purposes of explanation, and are not to be construed as limitations of the invention. Many modifications will be readily apparent to those of ordinary skill in the art which do not depart from the spirit and scope of the invention, as defined by the following claims and their legal equivalents.

What is claimed is:

1. A communication system, comprising:
   a fixed portion comprising:
   one or more control stations, each control station associated with a public switched telephone network (PSTN); and
   a mobile portion, comprising:
   one or more communication devices for exchanging communication signals with the one or more control stations,
   wherein tariff information, including a current tariff, a next tariff and a tariff switch time, is provided to the one or more communication devices from the one or more control stations at the initiation of a communication link, and the one or more communication devices calculate a total tariff associated with a communication link between the one or more communication devices and the one or more control stations based on the tariff information,
   and wherein further, information about the total tariffs calculated by the one or more communication devices is displayed by the one or more communication devices to respective users of the one or more communication devices.

2. The system of claim 1, wherein the communication devices are wireless communication devices.

3. The communication system of claim 1, wherein the fixed portion further comprises:
   a tariff computation device for calculating tariffs associated with one or more communication links between the one or more communication devices and the one or more control stations.

4. A method for use in a communication system comprising a fixed portion and a mobile portion, the fixed portion including a control station, the mobile portion including a communication device, the method being for calculating a tariff associated with a communication link, comprising the steps of:
   transmitting tariff information, including a current tariff, a next tariff and a tariff switch time, from the control station to the communication device at initiation of the communication link;
   calculating a total tariff associated with the communication link between the communication device and the control station at the communication device, using the tariff information;
   displaying information about the calculated total tariff to a user of the communication device.

5. The method of claim 4, wherein the communication link is a wireless communication link, and the step of transmitting is performed using a wireless communication signal.

6. The method of claim 4, wherein the fixed portion further includes a tariff computation device.

* * * * *